United States Patent
Jiang et al.

(10) Patent No.: US 10,613,652 B2
(45) Date of Patent: Apr. 7, 2020

(54) TOUCH DISPLAY APPARATUS AND METHOD FOR MANUFACTURING THE SAME

(71) Applicant: TPK Touch Solutions (Xiamen) Inc., Xiamen (CN)

(72) Inventors: Yau-Chen Jiang, Hsinchu (TW); Defa Wu, Jinjiang (CN); Jianbin Yan, Putian (CN); Jinhai Zhang, Longyan (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 690 days.

(21) Appl. No.: 15/051,632

(22) Filed: Feb. 23, 2016

(65) Prior Publication Data

US 2016/0246419 A1    Aug. 25, 2016

(30) Foreign Application Priority Data

Feb. 25, 2015 (CN) .......................... 2015 1 0087254

(51) Int. Cl.
*G06F 3/041* (2006.01)
*G02F 1/167* (2019.01)

(52) U.S. Cl.
CPC .............. *G06F 3/041* (2013.01); *G02F 1/167* (2013.01); *G06F 2203/04103* (2013.01); *Y10S 977/762* (2013.01)

(58) Field of Classification Search
None
See application file for complete search history.

(56) References Cited

U.S. PATENT DOCUMENTS

| | | | | |
|---|---|---|---|---|
| 9,626,024 | B1* | 4/2017 | Tan | G06F 3/0412 |
| 2011/0100727 | A1* | 5/2011 | Choi | G06F 3/0418 |
| | | | | 178/18.01 |
| 2013/0285966 | A1* | 10/2013 | Kimura | G06F 3/0412 |
| | | | | 345/173 |
| 2014/0375910 | A1* | 12/2014 | Tada | G06F 3/044 |
| | | | | 349/12 |
| 2015/0070292 | A1* | 3/2015 | Saran | H03K 17/9622 |
| | | | | 345/174 |
| 2015/0070605 | A1* | 3/2015 | Liu | G06F 3/0412 |
| | | | | 349/12 |
| 2016/0062509 | A1* | 3/2016 | Toyoshima | G02F 1/13338 |
| | | | | 345/174 |
| 2016/0070382 | A1* | 3/2016 | Toyoshima | G06F 3/044 |
| | | | | 349/12 |
| 2016/0209441 | A1* | 7/2016 | Mazzeo | G01P 15/125 |
| 2017/0003774 | A1* | 1/2017 | Iwata | B32B 27/06 |

* cited by examiner

*Primary Examiner* — Kent W Chang
*Assistant Examiner* — Benjamin Morales
(74) *Attorney, Agent, or Firm* — Cooper Legal Group, LLC

(57) ABSTRACT

A touch display apparatus is disclosed. The touch display apparatus includes an electrophoretic structure, a protective layer and at least one touch sensing layer. The protective layer is disposed on the electrophoretic structure. The touch sensing layer is disposed on the protective layer and takes the protective layer as a carrier.

13 Claims, 9 Drawing Sheets

TOUCH DISPLAY APPARATUS AND METHOD FOR MANUFACTURING THE SAME

BACKGROUND OF THE INVENTION

This application claims priority to Chinese Application Serial Number 201510087254.6, filed Feb. 25, 2015, which is herein incorporated by reference.

Technical Field of the Invention

The disclosure relates to a display apparatus, and more particularly to a touch display apparatus.

Description of Related Art

In pace with rapid development of display technology, many kinds of display apparatus are created, in which one kind of display apparatus is an electrophoretic display apparatus. The electrophoretic display apparatus has advantages such as low power consumption and flexibility, and has become popular. A typical electrophoretic display apparatus is controlled by a physical button on a housing of the display apparatus. The physical button occupies area of the housing, which is unfavorable for reducing size of the electrophoretic display apparatus.

Therefore, the touch electrophoretic display apparatus has been developed, which can be controlled by touching the screen of the electrophoretic display apparatus. In general, the touch electrophoretic display apparatus includes an electrophoretic structure, a protective layer and a touch sensing module. The protective layer covers the electrophoretic structure. The touch sensing module is adhered onto the protective layer.

The touch sensing module includes at least one glass substrate, and some touch sensing modules have more than two glass substrates. A sensing electrode is disposed on the glass substrate, and the sensing electrode takes the glass substrate as a carrier. The sensing electrode is configured to detect the touch location.

SUMMARY OF THE INVENTION

The present disclosure reduces the thickness of the touch display apparatus.

In accordance with one embodiment of the present disclosure, a touch display apparatus includes an electrophoretic structure, a protective layer and at least one touch sensing layer. The protective layer is disposed on the electrophoretic structure. The touch sensing layer is disposed on the protective layer and takes the protective layer as a carrier.

In accordance with another embodiment of the present disclosure, a method for manufacturing a touch display apparatus includes the following step. A touch sensing layer is formed on a protective layer on an electrophoretic structure.

In the foregoing embodiment, the touch sensing layer is disposed on the protective layer and takes the protective layer as a carrier, rather than taking a glass as a carrier. Therefore, the foregoing touch display apparatus omits the traditional glass substrate on which the touch sensing layer is disposed, thereby reducing the thickness of the touch display apparatus.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE INVENTION

Figure 1:
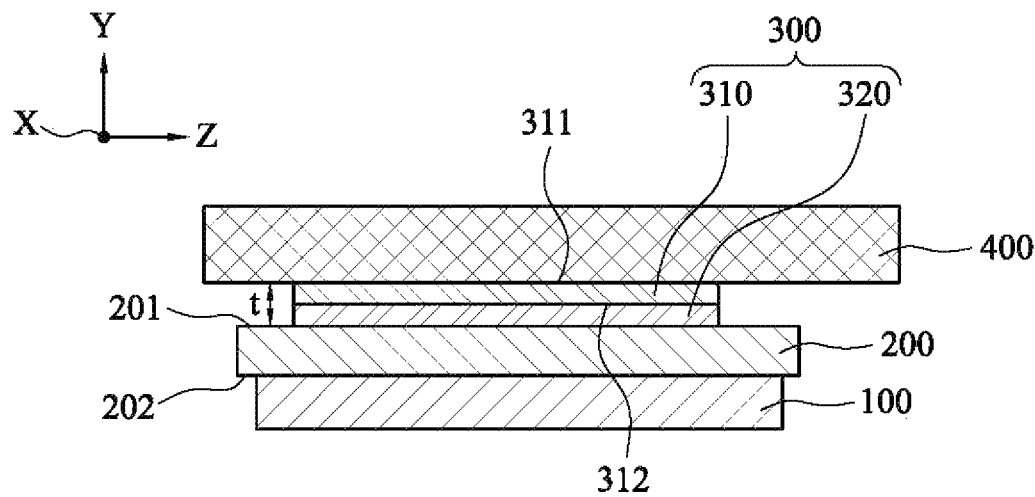
FIG. 1 is a cross-sectional schematic view of a touch sensing apparatus in accordance with at least one embodiment.

Reference will now be made in detail to embodiments of the disclosure, examples of which are illustrated in the accompanying drawings. Wherever possible, the same reference numbers are used in the drawings and the description to refer to the same or like parts.

FIG. 1 is a cross-sectional schematic view of a touch sensing apparatus 10 in accordance with at least one embodiment. As shown in FIG. 1, in some embodiments, the touch sensing apparatus includes an electrophoretic structure 100, a protective layer 200, a touch sensing layer 300 and a light guide plate 400. The protective layer 200 is disposed on the electrophoretic structure 100. The touch sensing layer 300 is disposed on the protective layer 200 and takes the protective layer 200 as a carrier. In other words, the protective layer 200 supports the touch sensing layer 300. The light guide plate 400 covers the touch sensing layer 300.

In the foregoing embodiments, the touch sensing layer 300 is disposed on the protective layer 200 and takes the protective layer 200 as the carrier. The material of the protective layer 200 is not glass, so the touch sensing layer 200 is not disposed on the glass. In other words, the touch sensing layer 200 does not take the glass as the carrier.

Therefore, the foregoing touch display apparatus omits the traditional glass on which the touch sensing layer 300 is disposed, thereby reducing the thickness of the touch display apparatus. For example, the material of the protective layer 200 can be, but is not limited to, polymethylmethacrylate (PMMA), polycarbonate (PC), polyvinyl chloride (PVC) or polyethylene terephthalate (PET).

Moreover, because the traditional glass on which the touch sensing layer 300 is disposed is omitted, the weight of the touch sensing apparatus can be reduced. In other words, by disposing the touch sensing layer 300 on the protective layer 200, the touch display apparatus can be lighter and thinner. Further, the light guide plate 400 covers the touch sensing layer 300, so that the light guide plate 400 can protect the touch sensing layer 300.

In some embodiments, as shown in FIG. 1, the touch sensing layer 300 is disposed on the protective layer 200 and is at least partially present between the protective layer 200 and the light guide plate 400. In other words, the protective layer 200 and the light guide plate 400 can be respectively disposed on the touch sensing layer 300, so that the touch sensing layer 300 can be protected by the protective layer 200 and the light guide plate 400.

In some embodiments, the touch sensing layer 300 can be implemented by various touch sensing panels, such as a capacitive touch panel, a resistive touch panel or an inductive touch panel. For example, in the capacitive touch panel, the touch sensing layer 300 has a plurality of electrodes thereon, and the touch sensing layer 300 can detect the touch locations by detecting the capacitance variation between the electrodes. Furthermore, the electrodes can be disposed on the same surface or on plural surfaces.

In some embodiments, as shown in FIG. 1, the touch sensing layer 300 includes a sensing electrode layer 310 and a thin film substrate 320. The sensing electrode layer is in contact with and fixed to the thin film substrate 320. The thin film substrate 320 is bonded to the protective layer 200. Alternatively, the thin film substrate 320 is adhered to the protective layer 200.

In particular, the protective layer 200 is located between the electrophoretic structure 100 and the light guide plate 400. The protective layer 200 has an upper surface 201 and a lower surface 202 opposite to each other. The upper surface 201 is farther from the eletrophoretic structure 100 than the lower surface 202 is. In other words, the upper surface 2101 is closer to the light guide plate 400 than the lower surface 202 is. The lower surface 202 is fixed to the electrophoretic structure 100. The thin film substrate 320 is adhered to the upper surface 201 of the protective layer 200 and is located between the protective layer 200 and the light guide plate 400. As a result, no glass is located between the touch sensing layer 300 and the protective layer 200, so as to reduce thickness and weight of the touch display apparatus.

In some embodiments, the sensing electrode layer 310 has a top surface 311 and a bottom surface 312 opposite to each other. The bottom surface 312 of the sensing electrode layer 310 is fixed to the thin film substrate 320, and the light guide plate 400 is adhered to the top surface 311 of the sensing electrode layer 310. As a result, no glass is located between the touch sensing layer 300 and the light guide plate 400, so as to reduce thickness and weight of the touch display apparatus.

The touch sensing electrode 300 has a thickness t. The thickness t is a dimension of the touch sensing layer 300 measured along the direction that the protective layer 200, the touch sensing layer 300 and the light guide plate 400 are arranged. In a greater, the protective layer 200, the touch sensing layer 300 and the light guide plate 400 are stacked in a Y direction, and each layer extends in an XZ plane, as shown in FIG. 1. The thickness t is a dimension of the touch sensing layer 300 measured along the Y direction. In some embodiments, the thickness t of the touch sensing layer 300 is less than 0.06 mm.

In some embodiments, the sensing electrode layer 310 includes light permeable material therein. The electrodes formed by the light permeable material (not shown) can detect touch location. The light permeable material may be, but is not limited to, indium tin oxide (ITO) or indium zinc oxide (IZO). A material of the thin film substrate 320 may include, but is not limited to, polyamide, PMMA, PC, PVC or PET. The touch sensing electrode 300 formed by any combination of the foregoing materials has the thickness t that ranges from 0.02 mm to 0.05 mm. In some embodiments, the thickness t is less than 0.03 mm.

In some embodiments, the sensing electrode layer 310 may include a plurality of nano metal wires therein for detecting touch location. The "nano metal wire" in this context refers to the metal wire having the nano-range diameter, so as to reduce the thickness of the sensing electrode layer 310. The material of the nano metal wire may include, but is not limited to, Au, Ag or Cu. When the sensing electrode layer 310 includes nano metal wires, the material of the thin film substrate 320 may include, but is not limited to, polyamide, PMMA, PC PVC or PET. The touch sensing layer 300 formed by any combination of the foregoing materials has the thickness t less than or equal to 0.056 mm.

In some embodiments, an anti-glare structure can be disposed above the light guide plate 400, so as to facilitate the user to see the image shown by the electrophoretic structure 100.

Figure 2:
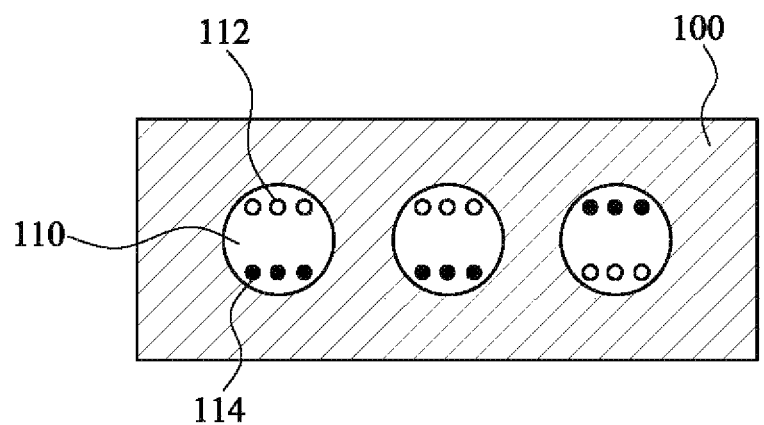
FIG. 2 is a cross-sectional schematic view of an electrophoretic structure in accordance with at least one embodiment.

FIG. 2 is a cross-sectional schematic view of an electrophoretic structure 100 in accordance with at least one embodiment. As shown in FIG. 2, the electrophoretic structure 100 includes a plurality of microcapsules 110. Each of the microcapsules 110 has a plurality of light-colored charged particles 112 and a plurality of dark-colored charged particles 114. The light-colored charged particles 112 and the dark-colored charged particles 114 have charges of different types. For example, the light-colored charged particles 112 may be negatively charged, and the dark-colored charged particles 114 may be positively charged. When the electrophoretic structure 100 is located in an electric field, the light-colored charged particles 112 and the dark-colored charged particles 114 move due to the influence of the electric field, so as to display a required image.

Figure 3A:
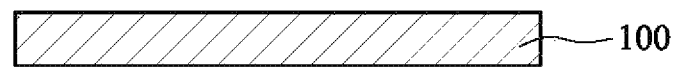
FIG. 3A to 3D are cross-sectional schematic views at steps during the method for manufacturing the touch display apparatus of FIG. 1.
Figure 3B:
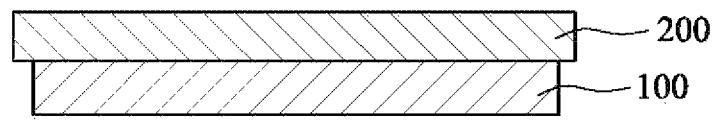
Figure 3C:
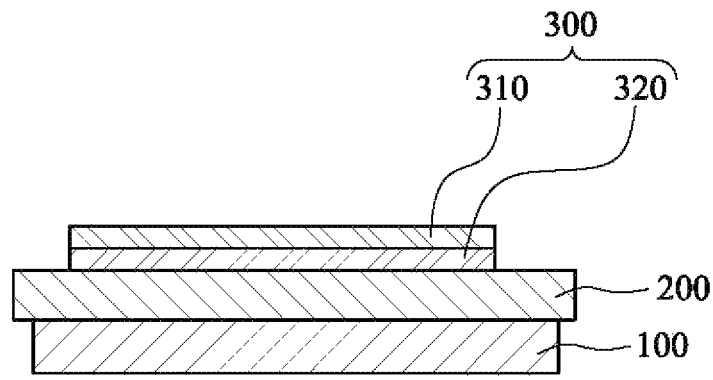
Figure 3D:
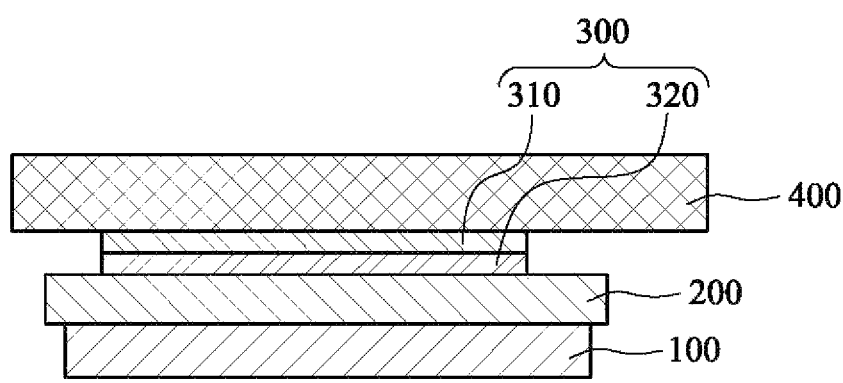

FIG. 3A to 3D are cross-sectional schematic views at steps during the method for manufacturing the touch display apparatus of FIG. 1. At first, as shown in FIG. 3A, the electrophoretic structure 100 is provided. In some embodiments, the electrophoretic structure 100 can be the structure shown in FIG. 2. Then, as shown in FIG. 3B, the protective layer 200 is disposed on the electrophoretic structure 100. Then, as shown in FIG. 3C, the touch sensing layer 300 is formed on the protective layer 200, so that the protective layer 200 supports the touch sensing layer 300. In other words, the touch sensing layer 300 takes the protective layer 200 as the carrier. For example, the thin film substrate 320 is provided in advance. Then, the sensing electrode layer 310 is formed on the thin film substrate 320. Then, the thin film substrate 320 is adhered onto the protective layer 200. Finally, as shown in FIG. 3D, the light guide plate 400 covers on the touch sensing layer 300. For example, the light guide plate 400 is fixed to the sensing electrode layer 310 of the touch sensing layer 300.

Figure 4:
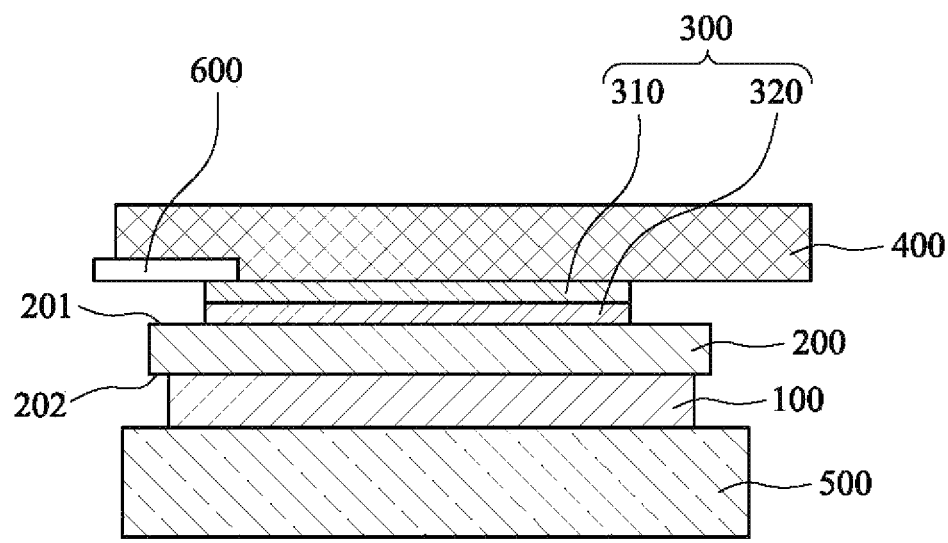
FIG. 4 is a cross-sectional schematic view of a touch display apparatus in accordance with other embodiments.

FIG. 4 is a cross-sectional schematic view of a touch display apparatus 10a in accordance with at least one other embodiment. The main difference between this configuration and the configuration shown in FIG. 1 is that: the touch display apparatus in this configuration further includes a TFT array module 500 and a flexible circuit board 600. The TFT array module 500 supports the electrophoretic structure 100, so as to provide an electric field to drive the light-colored charged particles 112 and the dark-colored particles 114 (See FIG. 2) in the microcapsule 110 for displaying an image. As shown in FIG. 4, the TFT array module 500 is disposed under the electrophoretic structure 100, and the touch sensing layer 300 is disposed above the electrophoretic structure 100. In other words, the TFT array module 500 and the touch sensing layer 300 are respectively located on two opposite sides of the electrophoretic structure 100. As shown in FIG. 4, the flexible circuit board 600 is disposed on the sensing electrode layer 310, and the flexible circuit board 600 is electrically connected to the sensing electrode layer 310. As a result, the sensing electrode layer 310 can be electrically connected to the external processing unit (not shown) via the flexible circuit board 600, so that the touch signals detected by the sensing electrode layer 310 can be transmitted to the processing unit.

In some embodiments, the flexible circuit board 600 is disposed on the sensing electrode layer 310 at an operation temperature. The flexible circuit board 600 and the sensing electrode layer 310 are electrically connected at the operation temperature. The operation temperature ranges from 120° C. to 150° C. In some embodiments, because the material of the protective layer 200 may deteriorate when the temperature is higher than 120° C., the flexible circuit board 600 is disposed on the sensing electrode layer 310 before the thin film substrate 320 is adhered onto the protective layer 200. In other words, when the touch sensing layer 300 is not disposed on the protective layer 200, the flexible circuit board 600 can be disposed on the sensing electrode layer 310 at the foregoing temperature, and then, the touch sensing layer 300 and the flexible circuit board 600 can be disposed on the protective layer 200 together at a temperature lower than the operation temperature. By this process, the protective layer 200 will not deteriorate due to the operation temperature.

In some embodiments, when the material of the protective layer 200 is PMMA, PC, PVC or PET, it can withstand the temperature higher than 150° C., and therefore, the impact to the protective layer 200 caused by the operation temperature can be ignored. As such, the flexible circuit board 600 can be disposed on the sensing electrode layer 310 after the thin film substrate 320 is adhered onto the protective layer 200. In other words, the touch sensing layer 300 can be disposed on the protective layer 200 in advance, and then, the flexible circuit board 600 can be disposed on the sensing electrode layer 310.

Figure 5:
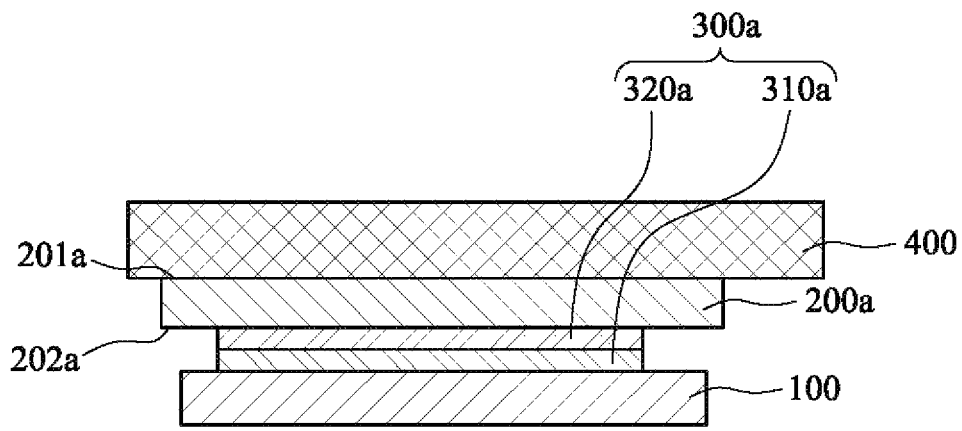
FIG. 5 is a cross-sectional schematic view of a touch display apparatus in accordance with other embodiments.

FIG. 5 is a cross-sectional schematic view of a touch display apparatus 10b in accordance with at least one other embodiment. The main difference between this configuration and the configuration shown in FIG. 1 is that: the touch sensing layer 300a is disposed under the protective layer 200a, not on the protective layer 200. In particular, the protective layer 200a has an upper surface 201a and a lower surface 202a opposite to each other. The lower surface 202a is closer to the electrophoretic structure 100 than the upper surface 201a is. In other words, the lower surface 202a is farther away from the light guide plate 400 than the upper surface 201a is. The thin film substrate 320a of the touch sensing layer 300a is adhered or bonded to the lower surface 202a of the protective layer, and the thin film substrate 320a is located between the protective layer 200a and the electrophoretic structure 100.

In some embodiments, the protective layer 200a is sandwiched between the light guide plate 400 and the touch sensing layer 300a, and the touch sensing layer 300a is at least partially present between the protective layer 200a and the electrophoretic structure 100. In other words, the electrophoretic structure 100, the touch sensing layer 300a, the protective layer 200a and the light guide plate 400 are arranged in order.

Figure 6:
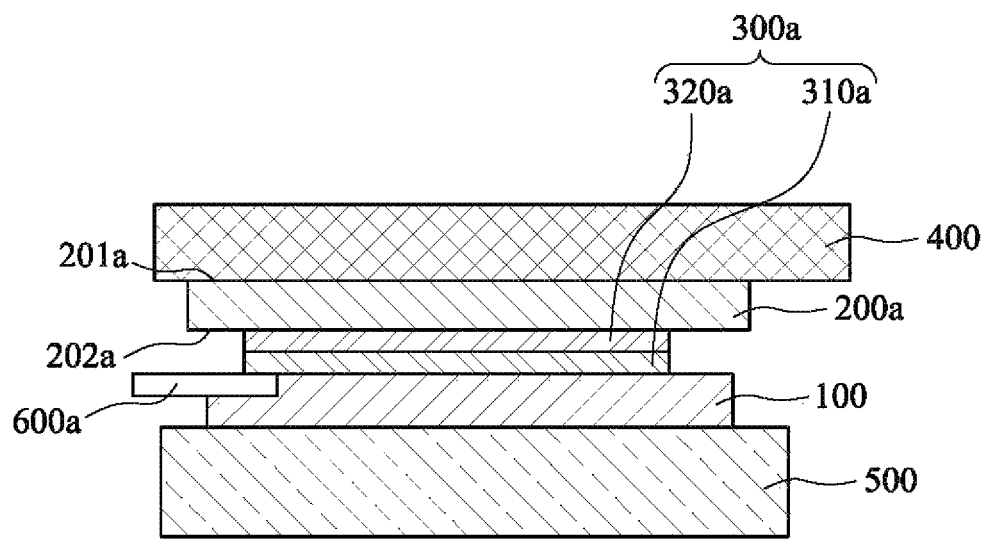
FIG. 6 is a cross-sectional schematic view of a touch display apparatus in accordance with other embodiments.

FIG. 6 is a cross-sectional schematic view of a touch display apparatus 10c in accordance with at least one other embodiment. The main difference between this configuration and the configuration shown in FIG. 5 is that: the touch display apparatus 10c further includes a TFT array module 500 and a flexible circuit board 600a. The TFT array module 500 supports the electrophoretic structure 100, so as to provide an electric field to drive the light-colored charged particles 112 and the dark-colored particles 114 (See FIG. 2) in the microcapsule 110 for displaying an image. The flexible circuit board 600a is disposed on the sensing electrode layer 310a, and the flexible circuit board 600a is electrically connected to the sensing electrode layer 310a, so that the touch signals detected by the sensing electrode layer 310a can be transmitted to the external processing unit.

Figure 7:
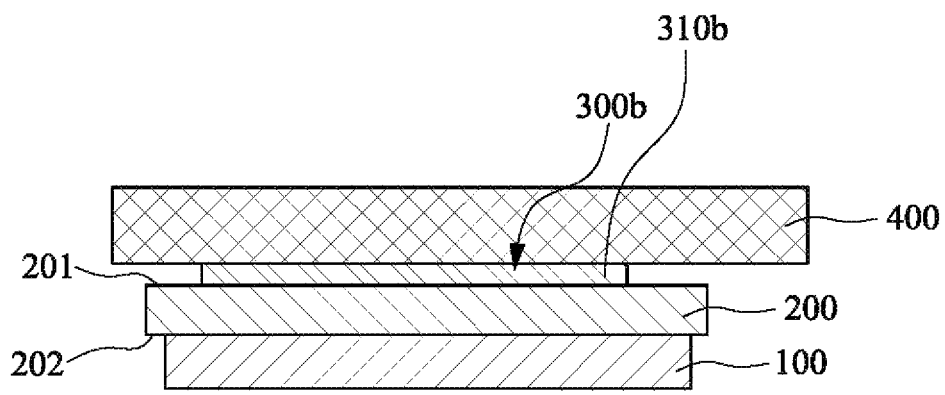
FIG. 7 is a cross-sectional schematic view of a touch display apparatus in accordance with other embodiments.

FIG. 7 is a cross-sectional schematic view of a touch display apparatus 10d in accordance with at least one other embodiment. The main difference between this configuration and the configuration shown in FIG. 1 is that: the touch sensing layer 300b is a sensing electrode layer 310b directly disposed on the protective layer 200. For example, the light permeable material or a plurality of nano metal wires can be printed on the protective layer 200, so as to form the sensing electrode layer 310b. Alternatively, a light permeable material or nano metal wires can be printed on the protective layer 200, and the foregoing material can form electrodes by the lithography or laser process, so as to form the sensing electrode layer 310b. As a result, the thin film substrate 320 (See FIG. 1) can be omitted in this configuration, thereby further reducing the thickness of the touch display apparatus 10d.

In this configuration, the touch sensing layer 300b is disposed on the protective layer 200 and is at least present between the protective layer 200 and the light guide plate 400. In other words, the touch sensing layer 300b is disposed on the upper surface 201 of the protective layer 200. The electrophoretic structure 100, the protective layer 200, the touch sensing layer 300b and the light guide plate 400 are arranged in order.

Figure 8:
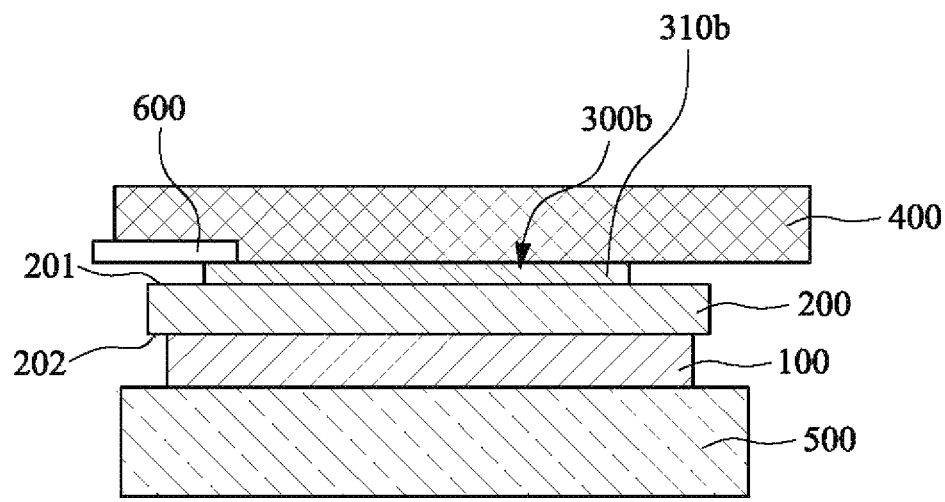
FIG. 8 is a cross-sectional schematic view of a touch display apparatus in accordance with other embodiments.

FIG. 8 is a cross-sectional schematic view of a touch display apparatus 10e in accordance with at least one other embodiment. The main difference between this configuration and the configuration shown in FIG. 7 is that: the touch display apparatus 10e further includes a TFT array module 500 and a flexible circuit board 600. The TFT array module 500 supports the electrophoretic structure 100, so as to provide an electric field to drive the light-colored charged particles 112 and the dark-colored particles 114 (See FIG. 2) in the microcapsule 110 for displaying an image. The flexible circuit board 600 is disposed on the sensing electrode layer 310b, and the flexible circuit board 600 is electrically connected to the sensing electrode layer 310b, so that the touch signals detected by the sensing electrode layer 310b can be transmitted to the external processing unit.

Figure 9:
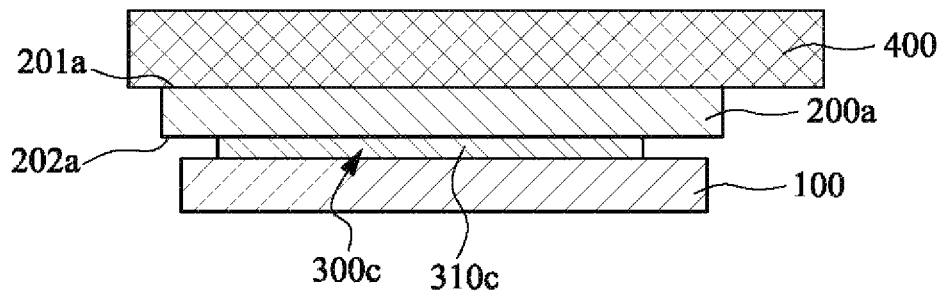
FIG. 9 is a cross-sectional schematic view of a touch display apparatus in accordance with other embodiments.

FIG. 9 is a cross-sectional schematic view of a touch display apparatus 10f in accordance with at least one other embodiment. The main difference between this configuration and the configuration shown in FIG. 7 is that: the touch sensing layer 300c is disposed under the protective layer 200a, not on the protective layer 200a. In other words, the touch sensing layer 300c is disposed on the lower surface 202a of the protective layer 200a, and it is located between the protective layer 200a and the electrophoretic structure 100. The electrophoretic structure 100, the touch sensing layer 300c, the protective layer 200a and the light guide plate 400 are arranged in order.

In this configuration, the touch sensing layer 300c is a sensing electrode layer 310c directly disposed on the lower surface 202a of the protective layer 200a, so that the thin film substrate 320 (See FIG. 1) can be omitted, thereby reducing the thickness of the touch display apparatus 10f.

Figure 10:
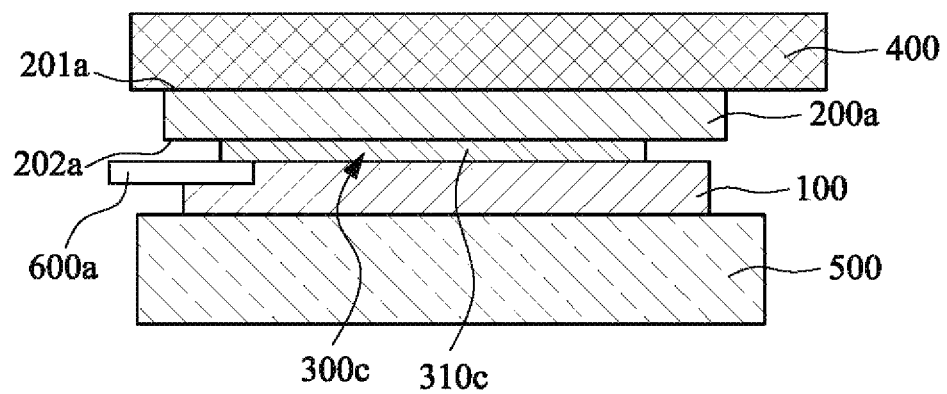
FIG. 10 is a cross-sectional schematic view of a touch display apparatus in accordance with other embodiments.

FIG. 10 is a cross-sectional schematic view of a touch display apparatus 10g in accordance with at least one other embodiment. The main difference between this configuration and the configuration shown in FIG. 9 is that: the touch display apparatus 10g further includes a TFT array module 500 and a flexible circuit board 600a. The TFT array module 500 supports the electrophoretic structure 100, so as to provide an electric field to drive the light-colored charged particles 112 and the dark-colored particles 114 (See FIG. 2) in the microcapsule 110 for displaying an image. The flexible circuit board 600a is disposed on the sensing electrode layer 310c, and the flexible circuit board 600a is electrically connected to the sensing electrode layer 310c, so that the touch signals detected by the sensing electrode layer 310c can be transmitted to the external processing unit.

Figure 11:
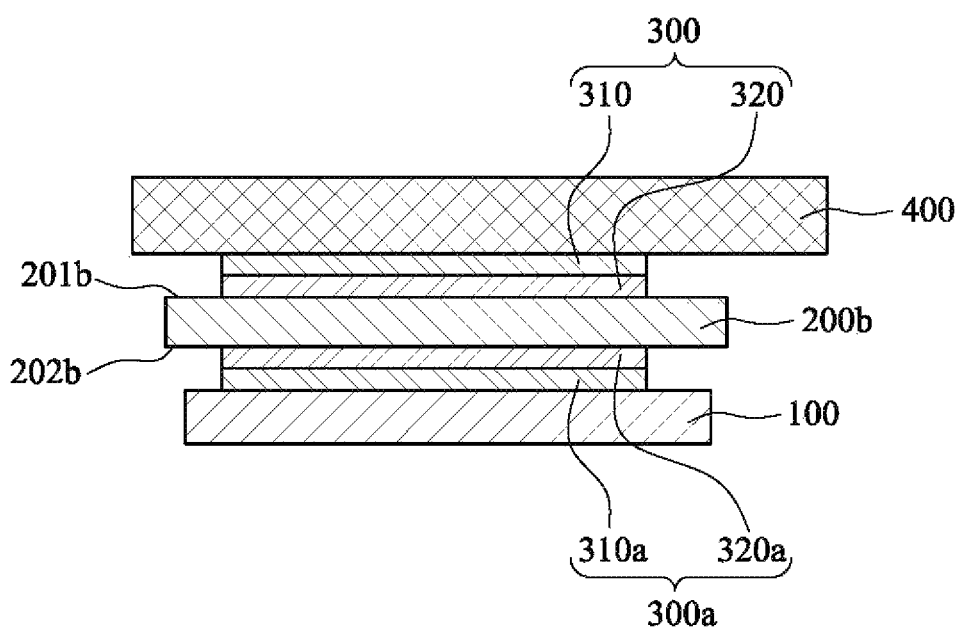
FIG. 11 is a cross-sectional schematic view of a touch display apparatus in accordance with other embodiments.

FIG. 11 is a cross-sectional schematic view of a touch display apparatus 10h in accordance with at least one other embodiment. The main difference between this configuration and foregoing configurations is that: the touch display apparatus 10h includes two touch sensing layers 300 and 300a. The protective layer 200b has an upper surface 201b and a lower surface 202b opposite to each other. The touch sensing layers 300 and 300a are respectively disposed on the upper surface 201b and the lower surface 202b. As a result, the touch display apparatus 10h can employ the upper and lower touch sensing layers 300 and 300a to detect the touch location. The touch sensing layer 300 includes the sensing electrode layer 310 and the thin film substrate 320 stacked on each other. The structural and functional relations between the touch sensing layer 300 and other elements can be referred to FIG. 1 and the related description in this context. The touch sensing layer 300a includes the sensing electrode layer 310a and the thin film substrate 320a stacked on each other. The structural and functional relations between the touch sensing layer 300a and other elements can be referred to FIG. 5 and the related description in this context.

Figure 12:
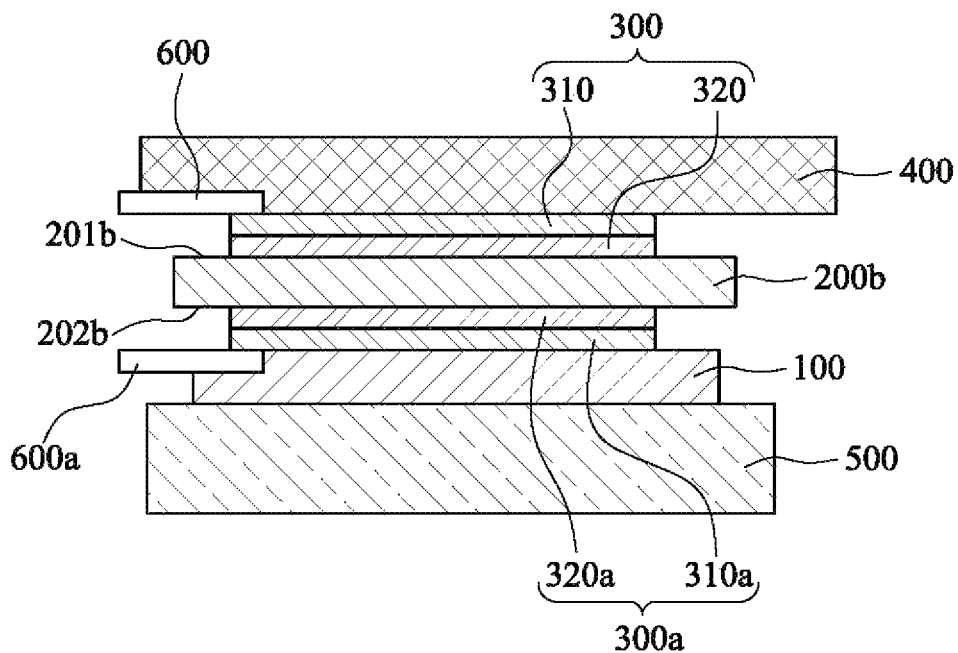
FIG. 12 is a cross-sectional schematic view of a touch display apparatus in accordance with other embodiments.

FIG. 12 is a cross-sectional schematic view of a touch display apparatus 10i in accordance with at least one other embodiment. The main difference between this configuration and the configuration shown in FIG. 11 is that: the touch display apparatus 10i further includes a TFT array module 500 and flexible circuit boards 600 and 600a. The TFT array module 500 supports the electrophoretic structure 100. The flexible circuit boards 600 and 600a are respectively disposed on the sensing electrode layers 310 and 310a, and the flexible circuit boards 600 and 600a are respectively electrically connected to the sensing electrode layers 310 and 310a.

Figure 13:
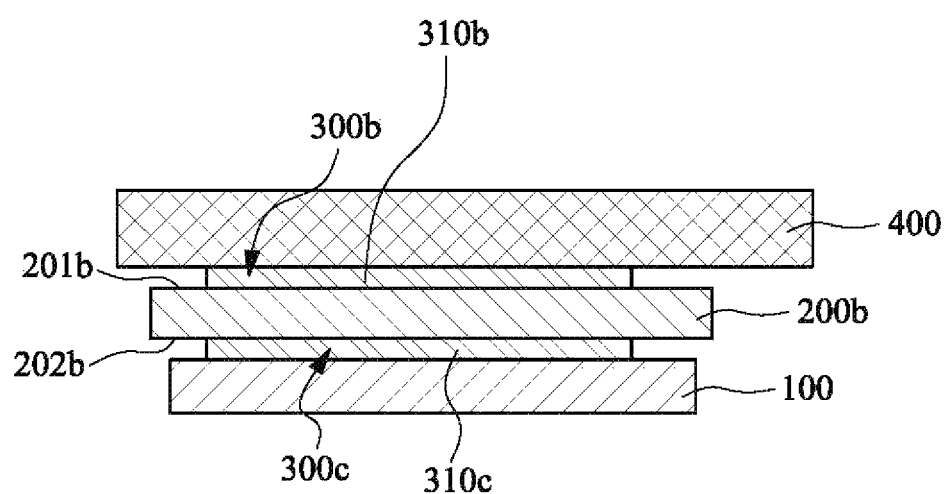
FIG. 13 is a cross-sectional schematic view of a touch display apparatus in accordance with other embodiments.

FIG. 13 is a cross-sectional schematic view of a touch display apparatus 10j in accordance with at least one other embodiment. The main difference between this configuration and the configuration shown in FIG. 11 is that: the touch display apparatus 10j includes two touch sensing layers 300b and 300c respectively disposed on the upper surface 201b and the lower surface 202b of the protective layer 200b. The touch sensing layer 300b is a sensing electrode layer 310b directly disposed on the upper surface 201b of the protective layer 200b. The touch sensing layer 300c is a sensing electrode layer 310c directly disposed on the lower surface 202b of the protective layer 200b.

Figure 14:
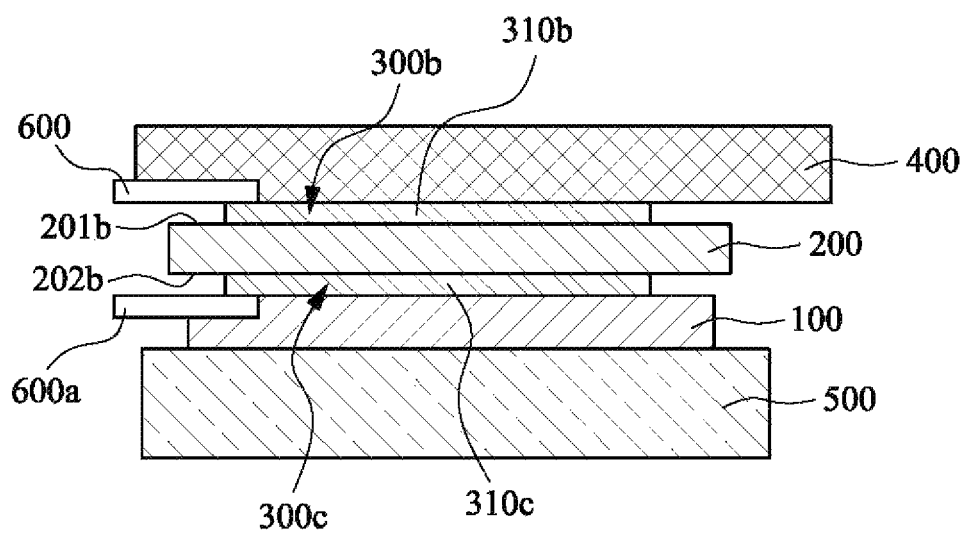
FIG. 14 is a cross-sectional schematic view of a touch display apparatus in accordance with other embodiments.

FIG. 14 is a cross-sectional schematic view of a touch display apparatus 10k in accordance with at least one other embodiment. The main difference between this configuration and the configuration shown in FIG. 13 is that: the touch display apparatus 10k further includes a TFT array module 500 and flexible circuit boards 600 and 600a. The TFT array module 500 supports the electrophoretic structure 100. The flexible circuit boards 600 and 600a are respectively disposed on the sensing electrode layers 310b and 310c, and the flexible circuit boards 600 and 600a are respectively electrically connected to the sensing electrode layers 310b and 310c.

Figure 15:
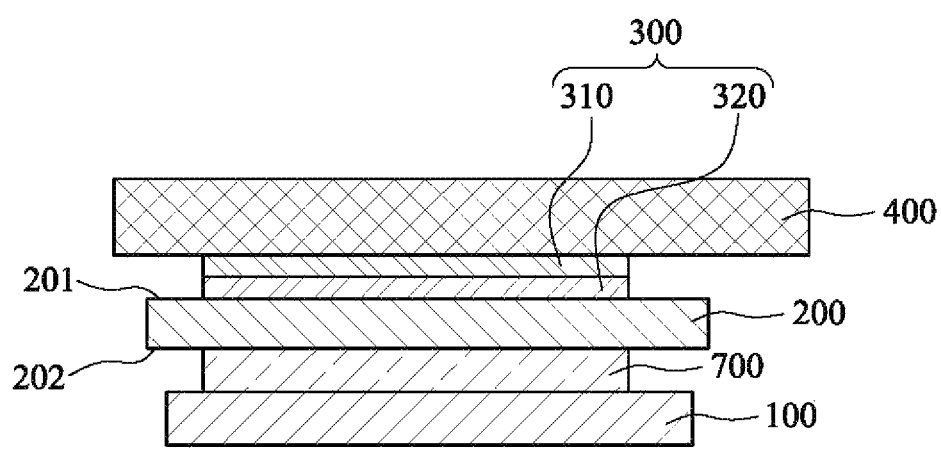
FIG. 15 is a cross-sectional schematic view of a touch display apparatus in accordance with other embodiments.

FIG. 15 is a cross-sectional schematic view of a touch display apparatus 101 in accordance with at least one other embodiment. The main difference between this configuration and the configuration shown in FIG. 1 is that: the touch display apparatus 101 in this configuration further includes a shielding layer 700. The shielding layer 700 is located between the touch sensing layer 300 and the electrophoretic structure 100, so as to prevent the touch signal of the touch sensing layer 300 and the display signal of the electrophoretic structure 100 from interfering with each other. For example, the shielding layer 700 can be disposed on the lower surface 202 of the protective layer 200, and it can be at least partially present between the electrophoretic structure 100 and the protective layer 200. In some embodiments, the material of the shielding layer 700 can be conductive material, such as metal, but the material of the shielding layer 700 is not limited to be metal.

Figure 16:
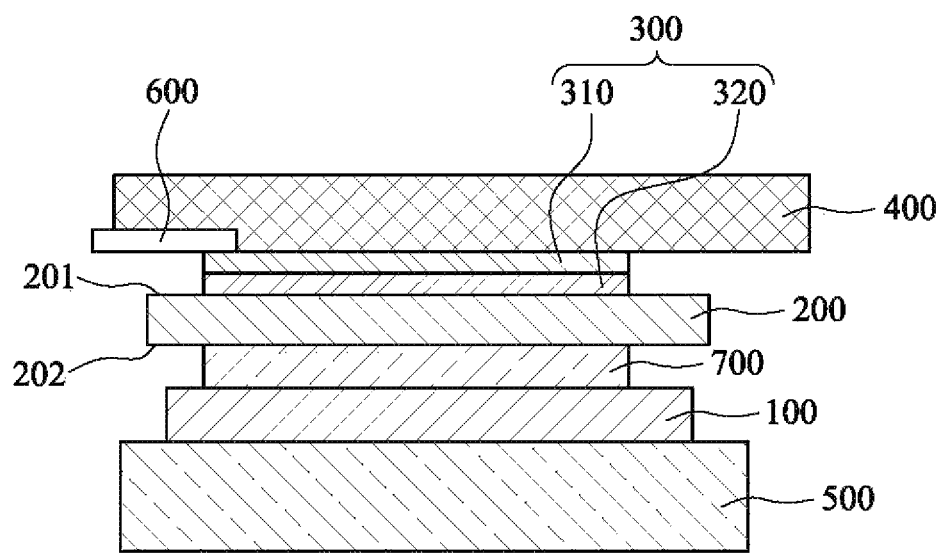
FIG. 16 is a cross-sectional schematic view of a touch display apparatus in accordance with other embodiments.

FIG. 16 is a cross-sectional schematic view of a touch display apparatus 10m in accordance with at least one other embodiment. The main difference between this configuration and the configuration shown in FIG. 15 is that: the touch display apparatus 10m further includes a TFT array module 500 and a flexible circuit board 600. The TFT array module 500 supports the electrophoretic structure 100. The flexible circuit board 600 is disposed on the sensing electrode layer 310, and the flexible circuit board 600 is electrically connected to the sensing electrode layer 310.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure without departing from the scope or spirit of the disclosure. In view of the foregoing, it is intended that the present disclosure cover modifications and variations of this disclosure provided they fall within the scope of the following claims.

What is claimed is:

1. A method for manufacturing a touch display apparatus, comprising;
   forming a touch sensing layer on a protective layer on an electrophoretic structure, wherein forming the touch sensing layer on the protective layer comprises;
   providing a thin film substrate;
   forming a sensing electrode layer on the thin film substrate; and
   adhering the thin film substrate onto the protective layer; and
   disposing a flexible circuit board on the sensing electrode layer and electrically connecting the flexible circuit board and the sensing electrode layer at an operation temperature, wherein the operation temperature ranges from 120° C. to 150° C.

2. The method of claim 1, wherein the flexible circuit board is disposed on the sensing electrode layer before the thin film substrate is adhered onto the protective layer.

3. The method of claim 1, wherein the flexible circuit board is disposed on the sensing electrode layer after the thin film substrate is adhered onto the protective layer.

4. The method of claim 1, further comprising placing a light guide plate over the touch sensing layer to cover the touch sensing layer.

5. The method of claim 1, further comprising forming a thin film transistor (TFT) array in direct contact with the electrophoretic structure.

6. The method of claim 1, further comprising forming a shielding layer between the electrophoretic structure and the protective layer.

7. The method of claim 1, wherein the electrophoretic structure includes a plurality of microcapsules, and each of the plurality of microcapsules has a plurality of light-colored charged particles and a plurality of dark-colored charged parties.

8. The method of claim 7, wherein the plurality of light-colored charged particles and the plurality of dark-colored charged parties have charges of different types.

9. The method of claim 1, wherein a material of the protective layer comprises polymethylmethacrylate (PMMA), polycarbonate (PC), polyvinyl chloride (PVC) or polyethylene terephthalate (PET).

10. The method of claim 1, wherein a material of the thin film substrate comprises polymethylmethacrylate (PMMA), polycarbonate (PC), polyvinyl chloride (PVC) or polyethylene terephthalate (PET).

11. The method of claim 1, wherein the sensing electrode layer comprises a light permeable material or a plurality of nano metal wires therein.

12. The method of claim 1, wherein a thickness of the touch sensing layer is less than 0.06 mm.

13. The method of claim 6, wherein a material of the shielding layer comprises a conductive material.

* * * * *